Aug. 20, 1957     C. F. WELLS     2,803,260
SELF-POWERED MIXING DEVICE

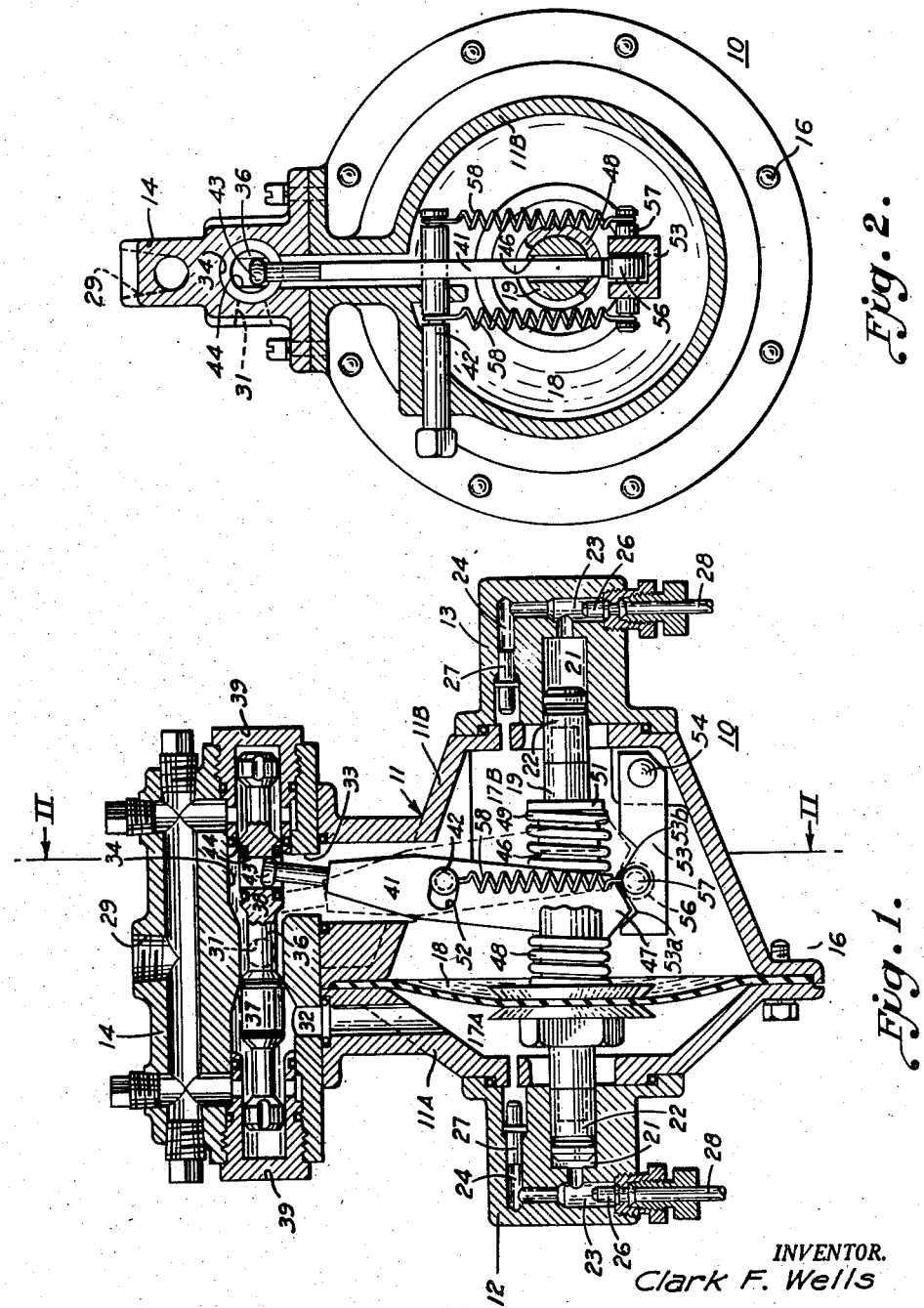

Filed April 18, 1955     2 Sheets-Sheet 2

INVENTOR.
Clark F. Wells
BY H. W. Brelsford
ATTORNEY 2,803,260
Patented Aug. 20, 1957

2,803,260

SELF-POWERED MIXING DEVICE

Clark F. Wells, Santa Barbara, Calif.

Application April 18, 1955, Serial No. 502,114

13 Claims. (Cl. 137—99)

My invention relates to devices for mixing one fluid with another in a measured ratio and has particular reference to a mechanical device proportioning fluid volume by positive displacement methods.

My invention is especially suited to the addition of small amounts of one fluid, liquid or gaseous, to another fluid, liquid or gaseous, in exact and precise amounts giving rise to a ratio of great precision. Such use occurs in industrial processes where accuracy is essential and occurs also in other fiields wherein the added fluid is very expensive. My method and apparatus may be used for any selected fluids and for any selected ratio.

Heretofore fluids have been mixed by various apparatuses and devices, but none have been inexpensive and at the same time reliable and effective. Flow responsive elements such as venturis have been employed, much in the fashion of carburetors, to achieve mixing independently of the rate of flow. Others have sought to use positive displacement apparatus, but with the result that fluid was wasted or "slippage" in the mixing ratio was encountered. My invention overcomes these problems by direct and positive volumetric relationship from the very minutest flow to full volume flow.

It is a general object of my invention to provide an accurate and reliable fluid mixing and proportioning device that operates continuously on flowing fluid as contrasted to batch mixing.

Another object is to provide a mixing device for flowing fluids wherein accuracy of mixing is obtained by positive displacement methods and apparatus.

Another object is to provide an automatic positive displacement fluid mixing and proportioning device having a snap actuator for valve operation.

A further object is to provide a reversible motor for a positive displacement fluid mixer wherein a spring biased detent action is provided that gives power to the valve actuating mechanism.

Other objects and advantages of my invention will be apparent in the following description and claims considered together with the accompanying drawings forming an integral part of this specification and in which:

Fig. 1 is an elevation view in full section through a presently preferred embodiment of the invention;

Fig. 2 is a transverse sectional view along the line II—II of Fig. 1;

Figure 3:
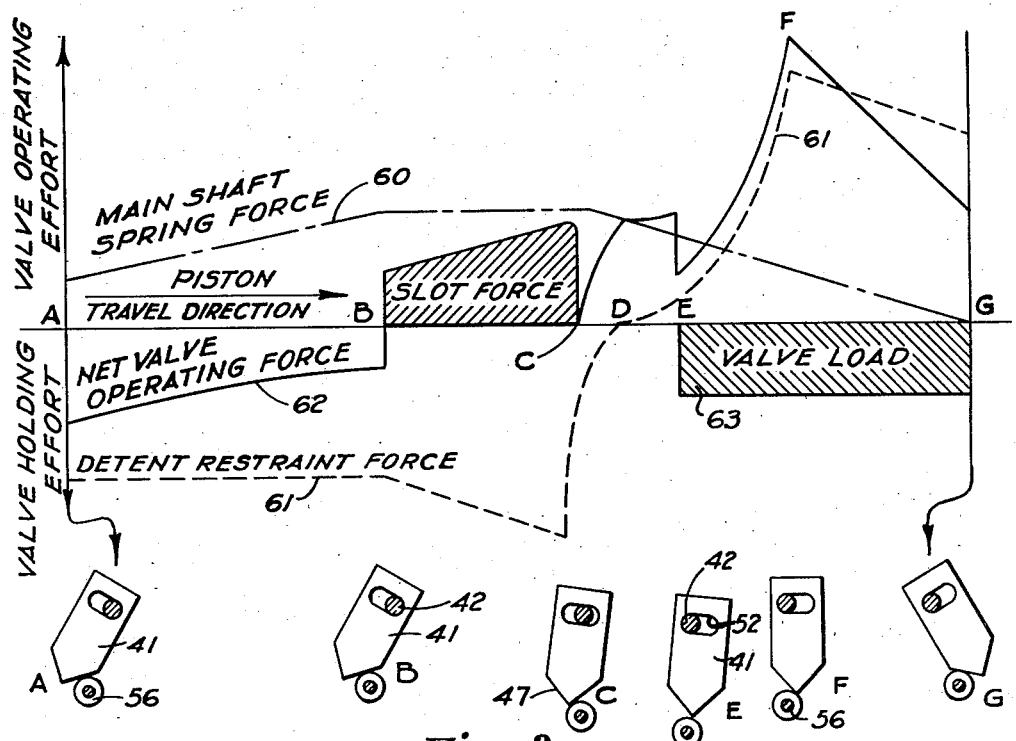
Fig. 3 is a diagram of the various forces acting upon the movable valve element for shifting the valve.

Referring to Figs. 1 and 2, there is illustrated a presently preferred embodiment of my invention which may be referred to generally by the reference numeral 10. The mixing device may have a hollow motor housing 11, a pair of pump housing 12 and 13 secured to opposite ends of the motor housing 11, and a valve housing 14 secured to the motor housing.

The hollow motor housing 11 may be formed of two shells 11A and 11B which may be fastened together, as by bolts 16, to clamp a flexible diaphragm 18 between them. This diaphragm acts as a piston and divides the housing hollow into two separate work chambers 17A and 17B. A piston rod 19 may be secured to the diaphragm 18 and opposite ends may be supported in cylindrical pump chambers 21 of each pump housing 12 and 13. The ends of the piston rod may be removable and accordingly a threaded cap 22 may be threated on each end of the piston rod. These caps 22 act as the pump piston and may be replaced with larger or smaller caps acting within larger or smaller pump chambers 21 of replacement pump housings 12 and 13. In this fashion the capacity of the pumps may be changed, thus changing the mixing ratio of the device 10.

Each pump housing has an inlet passage 23 and an outlet passage 24 communicating with the pump chamber 21. Check valves 26 and 27 may be disposed in the inlet and outlet respectively, Inlet conduits 28 may be attached to the inlets 23 and may be connected to a source of fluid to be mixed with the fluid driving the motor portion of the device.

The valve housing may have an inlet 29, an outlet 31, a first work port 32 and a second work port 33, all communicating with a central valve chamber 34. A valve slide 36 may be disposed in the valve chamber 34 and may have two operative lands 37 and 38 which may seal with the chamber in any suitable fashion as by O-ring seals. End caps 39 may be screwed into the valve housing 14 to complete the valve chamber and furnish a guide bore for the ends of the valve slide 36.

The movable valve element 36 is actuated particularly in accordance with my invention so that a positive type of snap action is obtained that gives rise to truly automatic operation. The valve may be actuated or shifted by means of a lever 41 pivoted on a pin 42. The lever 41 may have a knob 43 on its upper end which may fit within a transverse slot 44 in the movable valve element 36. The lower end of the lever 41 may pass through a slot 46 in the piston rod 19 and its lower end may project past the piston rod and be formed in a sword point or triangular end 47. A pair of compression springs 48 and 49 may be mounted on the piston rod 19 encircling the piston rod, and in their free condition overlying a major part of the slot 46. A collar 51 may be mounted on the piston rod 19 to restrain one end of the spring 49 and the other spring 48 may bear against the diaphragm 18 or other suitable element secured to the piston rod.

Because of the compression of the springs and the fact that slot 46 has a greater dimension along the piston rod than the width of the lever 41, there is a lost motion connection between piston rod 19 and the lever 41. A second lost motion connection is obtained by pivoting the lever 41 on the pin 42 by means of a slot 52 which is generally transverse to the length of the lever 41. This slot 52 accordingly provides a second lost motion mechanism for the lever 41.

In Fig. 1 the movable valve element 36 is shown in its most right hand position and is held in that position by means of a spring biased detent. The detent mechanism includes a detent arm 53 pivoted to the housing 11 at 54 and having a roller 56 or other friction reducing mechanism mounted thereon. The roller 56 engages the sword point 47 of the lever 41 and this roller may be mounted on a pin 57 that projects beyond the edges of the detent arm 53. A pair of compression springs 58 may be connected between the pin 57 and the pivot pin 42 to pull the detent arm 53 upwardly. The pivot pin 42 may be inserted into the housing half 11B from the outside of the housing as illustrated in Fig. 2 and the detent arm pivot 54 may be similarly constructed if desired.

In the operation of the device of Figs. 1 and 2, the movable valve element 36 is illustrated in the position which will cause fluid under pressure coming through the inlet 29 to flow around the left land 37 and into the work port 32 so that fluid under pressure will fill the chamber 17A to push the diaphragm 18 to the rigfht. At the same time the other work port 33 is open to exhaust by virtue of the fluid flowing around the land 38 and out the exhaust port 31. The two operative positions of the valve slide 36 are determined by the notches 53a and 53b in the detent arm 53 whereat the sword point 47 comes to rest. The diaphragm 18 will move to the right carrying the piston rod 19 with it. The spring 48 will bear against the lever 41 but because of the strength of the detent springs 58 the lever 41 will not change its position until spring 48 has compressed enough so that the left edge of the slot 46 contacts the lever 41. The valve slide 36 may, however, move to the right as seen in Fig. 1 until it strikes the end of its chamber. The source of the fluid acting on the piston rod 19 will overcome the detent springs 58 causing them to elongate and permitting the detent arm 53 to rotate counterclockwise. The valve element 36, however, will not move during this phase inasmuch as the slot 52 will permit the lever to move with respect to the pivot pin 42 which in turn permits the lever knob 43 to maintain its position. When the sword point 47 on the lever 41 has moved to a point where the roller 56 is disposed on the end of the point, the effort to move the lever 41 is practically nil and the compressed spring 48 will then rapidly snap to an extended position giving a quick rotative action to the lever 41. Since the left side of the lever slot 52 will then bear against the pin 42 the movable valve element 36 will be shifted. In addition to the snap action due to the compression spring 48 the detent springs 58 will assist this rotation of the lever 41 because of the strong upward pull of the springs 58 acting through the roller 56 on the incline of the sword point 47.

As the piston rod 19 moves to the right its pump head 22 compresses fluid in the pump chamber 21 of the housing 13 forcing it through the outlet conduit 24 and past the check valve 27 into the motor chamber 17B. There the fluid mixes with the motor fluid introduced through the inlet 29. At the same time a suction stroke will occur in the pump housing 12. This suction action occurs due to the lifting of the inlet check valve 26 and the seating of the outlet check valve 27. The reverse stroke is accomplished in the same manner as the stroke toward the right just described except that the piston spring 49 then gives the actuating snap action and the pump housing 12 then delivers its fluid under pressure into the motor chamber 17A whereat it mixes in an exact measured amount with the fluid which drives the motor. Since the displacement of the diaphragm 18 is equal in both directions regardless of the difference in size of the two motor chambers 17A and 17B there will be an exact mixing of measured amounts of fluid.

The advantages of my detent actuation of the valve shift lever are demonstrated in Fig. 3. There it will be noted that a series of diagrams of the lever 41 and the detent roller 56 are shown in positions that correspond to different points along the reversing stroke of the lever. Immediately above each position appears the diagram of the forces acting at that particular point in the stroke. As the piston rod 19 moves toward the right the piston spring 48 is compressed thus increasing the force which it exerts against the lever 41. This force is illustrated by the line 60. The detent, however, restrains any motion of the lever 41 and hence there is no change in position between points A and B in the diagram. This constant force, restraining movement of the lever 41, is illustrated by the broken line 61. The resultant force between the two opposing forces is the net valve operating force illustrated by the solid line 62. When, however, the edge of the piston slot 46 engages the lever 41, the lever 41 will start to move and the force applied by the piston is labeled "slot force" and the amount of force applied by the piston or slot is sufficient to bring the net operating force to zero as otherwise the lever 41 would not move. This first movement phase for the lever 41 takes place between the positions B and C and is indicated on the line 61 by an increasing restraining effort due to the elongation of the detent springs 58 and by a corresponding increase of the slot force to maintain the net operating force at zero. It is during this phase of the movement that the lever 41 moves with respect to its pin 42 by virtue of the transverse slot 52. As the point 47 of the lever 41 rides on top of the roller 56 the restraining forces suddenly approach zero and the compressed spring 48 immediately snaps the lever 41 in a clockwise position and this movement is faster than the piston movement, thus making it impossible for the piston to apply force to the lever 41 and the slot force accordingly becomes zero. By virtue of the O ring seals on the movable valve element 36 the friction of the valve slide is appreciable and this is shown by the shaded area 63. This shaded area accordingly reduces the available net operating force but since this force is still positive the valve continues to move at a rapid rate until the tangent at the point of engagement of the roller 56 is parallel to the straight edge of the point 47. This is achieved at point D in the diagram. The powerful tension springs 58 for the detent roller 56 then come fully into play giving a very strong operating force as shown by the high peak on the line 61 at that region. During this time the force of the piston spring 48 is constantly decreasing due to its extension but the sum of these two spring forces is so much greater than the valve load 63 that the valve is rapidly operated.

By comparing the piston spring force 60 with the valve load 63 it is apparent that if the piston springs were used alone that there would be insufficient force available to fully move the valve since the spring force would cease to be effective at the point where it equals the valve load and hence valve movement would stop at some intermediate point and the valve shift would not take place until the piston would again engage up with the lever 41. But, however, the intermediate positioning of the movable valve element would stop all motor operation so that the piston rod 19 would not catch up with the lever 41 and the motor would be stalled. The use of the detent spring forces therefore gives rise not only to a restraining action which assists in a snap action, but additionally gives a very substantial positive operating force once the lost motion has been taken up in the valve actuating system.

Figure 4:
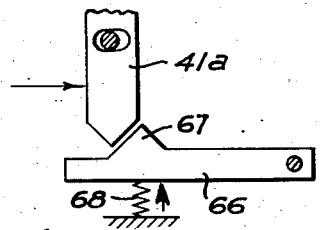
Fig. 4 is a diagrammatic fragmentary elevation view of a modified form of a detent operator for the valve actuating mechanism.

Illustrated in Fig. 4 is a modification of the detent actuator wherein a lever 66 has a pointed projection 67 and is urged upwardly by a spring 68. A lever 41a operated upon by the same forces previously described would react in substantially the same fashion except that the breakover point between restraint and actuation of the lever would be sharper than that of the roller 56.

Figure 5:
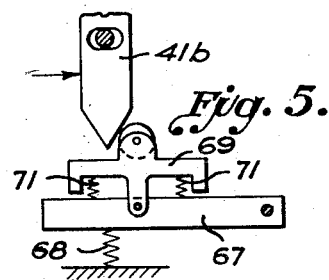
Fig. 5 is a diagrammatic fragmentary elevation view of another modified form of detent valve operator.

Illustrated in Fig. 5 is another modification wherein a detent arm 67 is pivoted and urged upwardly by a spring 68. A double armed roller support 69 is centrally pivoted and maintained in a neutral position by a pair of springs 71. As forces move a valve actuator arm 41b to the right the entire member 69 will pivot clockwise until the center point is reached whereupon the springs 71 will cause a rapid movement in a counterclockwise direction and the spring 68 will cause an upward thrust of the entire assembly applying the positive valve actuating force to the lever 41b in a very rapid fashion.

Figure 6:
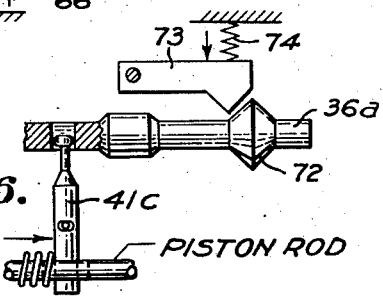
Fig. 6 is a diagrammatic fragmentary view of a valve operator and movable valve element wherein the detent is applied to the movable valve element.

Illustrated in Fig. 6 is still another modification wherein the detent action is applied to a movable valve element 36a having a double conical projection 72 formed axially thereon. A pivoted detent arm 73 may bear against this projection 72 under the influence of a spring 74. A valve actuating lever 41c may impart initial movement forces to the valve slide 36a causing the lost motion movement of the lever previously described with the detent arm 73 providing a restraining force until dead center is achieved and thereafter adding an actuating force by acting on the right hand incline of the projection 72.

Figure 7:
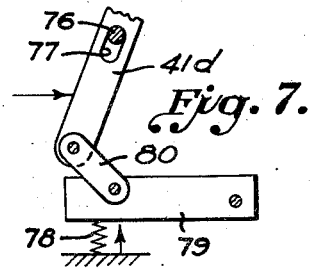
Fig. 7 is a diagrammatic fragmentary elevation view of still another modified form of detent valve actuator.

Illustrated in Fig. 7 is a toggle joint detent structure wherein a valve actuating arm 41d may be pivoted to a pin 76 through an elongated slot 77. The initial piston movement will cause the lever 41d to move upwardly in its slot without substantially moving the slide valve connected at the upper end and after passing dead center the forces of a compression spring 78 acting through a detent arm 79 upon a toggle 80 will give rise to a valve shifting force that will snap the lever 41d counterclockwise.

Figure 8:
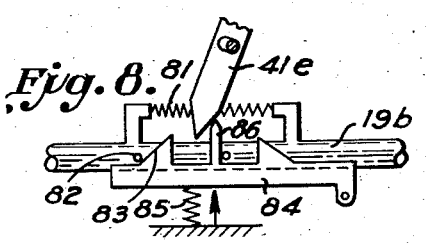
Fig. 8 is a fragmentary diagrammatic elevation view of still another detent valve actuator.

Illustrated in Fig. 8 is a detent structure wherein the piston rod triggers a detent arm. A piston rod 19b may have an arm carrying a compression spring 81 which applies a rotating force to a lever arm 41e. A pin 82 engages an inclined surface 83 on a detent arm 84 urged upwardly by a compression spring 85. As the pin 82 forces the lever arm 84 counterclockwise the lever 41e will rotate counterclockwise due to the lowering of a center finger 86. When the finger 86 is opposite the point of the lever 41e the pin 82 will pass over the top of the incline 83 whereupon the lever will be permitted to rotate clockwise again forcing the finger 86 against the lever 41e to generate a rotative force. The other pin on the piston rod will at that point have passed over the right hand incline on the lever 84 so that the mechanism is reversible for operation in the other direction.

The invention is capable of insertion in many types of fluid flow systems. For example, the total flow may be regulated by a valve in the line to the inlet 29 upstream from that inlet. The invention has found utility in a system for medicating water for fowl wherein the control valve is downstream from the outlet 31. Regardless of the system of control, however, the mixing is precise and under complete control regardless of the rate of operation of the device. The fluid flow rate for the device is, of course, controlled by its designs, larger porting giving rise to faster action. As mentioned previously, the ratio may be changed by replacing pump housings 12 and 13 with housings having larger or smaller pump bores in which case larger or smaller end caps 22 may be placed on the piston rod 19. For very minute ratios one pump may be sealed off so that the device operates with only one pump. The mixing of the pumped fluid may occur before the motive fluid reaches the motor, or after it leaves the motor. No fluid, however, is wasted by the system regardless of its mode of operation and hence extremely valuable material is never lost. The conduits to the inlets 23 of the pump are preferably communicating with fluids under a low hydraulic lift to insure freedom from cavitation and for gaseous mixing the conduits may be connected to a container where the gas is under an enclosed container above or below hydraulic pressure.

While I have described my invention with respect to specific embodiments thereof I do not limit myself to these embodiments but claim all modifications and variations that fall within the true spirit and scope of my invention.

I claim:

1. A fluid mixing device comprising: a hollow motor housing having inlet and outlet ports; a diaphragm secured in the housing to form a pair of work chambers from said hollow; a pair of pump housings secured to said motor housing on opposite sides of the diaphragm, each having a cylindrical pump chamber disposed on a common axis, an outlet port communicating with the adjacent motor work chamber, and an inlet; valves disposed in the inlet and outlet of each pump housing; a piston rod secured to the diaphragm and having ends disposed in the pump chambers; valve means for reversibly connecting the motor work chambers to inlet and outlet ports of the motor housing; and a mechanical actuator interconnecting the piston rod and the valve means, whereby the motor drives the pumps which deliver their output into the motor work chambers to mix with the driving fluid of the motor.

2. A fluid mixing device as described in claim 1 wherein the pump housings are removable and ends of the piston rod within the pump chambers are removable, so that ends of different size and a pump housing of correspondingly different size of pump chambers may be substituted so that the ratio of mixture of the fluids may be varied.

3. A fluid mixing and proportioning device comprising: a hollow motor housing having inlet and outlet ports and a pair of work chamber ports; a piston in the housing to form a pair of work chambers from said hollow; a reciprocating piston rod connected to said piston; a positive displacement pump connected to and mechanically driven by said piston rod and having an outlet; a conduit connecting the pump outlet to one of the work chambers of the motor housing; a four-way valve interconnecting the motor inlet, outlet and work ports and having a moving element; and a mechanical actuator interconnecting the piston rod and the valve moving element, whereby reversal of motor operation is automatic in response to fluid acting on the motor, and the output of the pump is mixed with the motive fluid within the motor housing in a predetermined proportion.

4. A fluid mixing and proportioning device as defined in claim 3 wherein the mechanical actuator is a snap action lever.

5. A fluid mixing device comprising: a hollow motor housing having inlet and outlet ports and a pair of work chamber ports; a piston movable in said housing and forming a pair of work chambers from said hollow; a reciprocating piston rod connected to said piston; a positive displacement pump connected to and mechanically driven by said piston rod and having an outlet; a conduit connecting the pump outlet to a fluid flow portion of said motor housing; a four-way valve interconnecting the motor inlet, outlet and work ports and having a moving element; a lever pivoted to the motor housing and interconnecting the piston rod and the valve element with a lost motion connection, said valve element and lever constituting a flow reversing mechanism; a projection on said flow reversing mechanism; and a detent biased against said projection, whereby the lost motion permits substantial movement of the lever without moving the valve element and the biased detent gives power to the reversing mechanism to assist in moving the valve element.

6. A fluid mixing device as defined in claim 5 wherein the detent acts on the valve element.

7. A fluid mixing device as defined in claim 5 wherein the detent acts on the lever.

8. A fluid proportioning device comprising: a double acting fluid motor having a piston rod, a fluid inlet and a fluid outlet; conduit means connected to the inlet and outlet for motive fluid for said motor and forming a closed fluid system with said motor; a control valve spaced from said piston rod and having a movable valve element to reverse fluid from the inlet and outlet to make the motor double acting; a fluid pump driven by the piston rod and having an outlet connected to the closed system to mix the pump output with the motive fluid for the motor; a pivoted lever driven by the piston rod and engaging movable valve element; a lost motion connection of the lever between the piston rod and the movable valve element; a detent arm pivoted to the motor adjacent to the piston rod and having a projection engaging the lever; and resilient means urging said detent arm and its projection into engagement with the lever, whereby piston rod travel does not actuate the movable valve element until the lost motion is completed, and after overcoming the detent, the detent acts to drive the lever for fast valve action.

9. A fluid mixing device as set forth in claim 8 wherein the detent arm projection is a roller.

10. A fluid mixing device as set forth in claim 8 wherein the detent projection is a mechanical point on the detent arm.

11. A fluid mixing device as set forth in claim 8 wherein the detent projection is pivoted to the detent arm and opposing springs maintain the projection in a center rest position.

12. A fluid mixing device as set forth in claim 8 wherein the detent arm is connected to the lever by a toggle link.

13. A fluid mixing device as set forth in claim 8 wherein the detent arm is rotated against the detent resilient means by mechanical engagement between the arm and the piston rod.

References Cited in the file of this patent

UNITED STATES PATENTS

| | | |
|---|---|---|
| 2,413,029 | McFarland | Dec. 24, 1946 |
| 2,445,540 | Smillie | July 20, 1948 |

FOREIGN PATENTS

| | | |
|---|---|---|
| 612,738 | Great Britain | Nov. 17, 1948 |
| 861,673 | Germany | Jan. 5, 1953 |